Patented Dec. 27, 1949

2,492,645

UNITED STATES PATENT OFFICE 2,492,645

PRODUCTION OF THIOPHENECARBOXYLIC ACID

George C. Johnson, Woodbury, and John W. Schick, Camden, N. J., assignors to Socony-Vacuum Oil Company, Incorporated, a corporation of New York No Drawing. Application February 4, 1949, Serial No. 74,697

5 Claims. (Cl. 260—329)

1

This invention relates to a process for the production of thiophenecarboxylic acid and, more particularly, is directed to a process for manufacturing 2-thiophenecarboxylic acid from 2-acetylthiophene by an efficient, commercially feasible procedure.

Thiophenecarboxylic acid has heretofore been made by saponification of thiophene nitriles, by the action of carbon dioxide on a thiophene Grignard reagent and by the oxidation of alkyl and acyl substituted thiophenes with alkaline permanganate solutions. None of these available procedures lends itself to the provision of a commercially attractive method for the manufacture of thiophenecarboxylic acid. The methods of preparation from nitriles and Grignard reagents are time-consuming and relatively complicated, necessitating the synthesis of expensive intermediate compounds. The methods involving oxidation of alkyl and acyl substituted thiophenes with alkaline permanganate yield, in addition to the desired nuclear thiophenecarboxylic acid, a second acid wherein the carboxy group is contained in a side chain attached to the thiophene nucleus. Thus, upon reacting 2-acetylthiophene with alkaline permanganate, the resulting product mixture contains 2-thiophenecarboxylic acid ($C_4H_3SCOOH$) and 2-thienyl glyoxalic acid ($C_4H_3SCOCOOH$). This mixture of acids is separated only with difficulty. The usual method of separation requires the addition of a sufficient quantity of sodium carbonate to convert the thiophenecarboxylic acid to its sodium salt and thereafter removing the thienyl glyoxalic acid from the mixture by solvent extraction with ether. While the latter procedure represents a feasible means of synthesizing small quantities of thienyl glyoxalic acid, such a method is not at all adaptable for the commercial production of 2-thiophenecarboxylic acid.

In accordance with the present invention, it has now been discovered that 2-thiophenecarboxylic acid may be obtained in an efficient manner by reacting 2-acetylthiophene with nitric acid dissolved in acetic acid in such amount that a solution having a concentration of between about 1 and about 20 per cent by weight of nitric acid results.

It has been found that by reacting 2-acetylthiophene with the aforesaid acetic acid solution of nitric acid, 2-thiophenecarboxylic acid is obtained in an efficient and straightforward manner as the sole acid product and to the exclusion of thienyl substituted acids having the carboxy group located in the side chain. It has

2 thus been found, with the present invention, that 2-thiophenecarboxylic acid may be obtained easily and directly in commercially attractive yields without the preparation of expensive intermediate compounds and without entailing an involved procedure for separation of the reaction product mixture. Thus, in addition to affording a high yield of desired product, the present process affords an economical and efficient method for the production of 2-thiophenecarboxylic acid.

It is, accordingly, an object of the present invention to provide an efficient process for producing 2-thiophenecarboxylic acid. Another object is to afford a process for the manufacture of 2-thiophenecarboxylic acid in an economical and commercially feasible manner. A still further object is the provision of a method for making 2-thiophenecarboxylic acid from readily available compounds, without necessitating the preparation of expensive chemical intermediates. A very important object is to provide a process for producing 2-thiophenecarboxylic acid in a straightforward manner without involving detailed after-treatment of the reaction product mixture.

These and other objects which will be recognized by those skilled in the art are attained in accordance with the present invention, whereby 2-acetylthiophene is reacted with an acetic acid solution of nitric acid under conditions yielding 2-thiophenecarboxylic acid.

The concentration of nitric acid contained in acetic acid solution is an important feature of the present process. The minimum concentration of nitric acid is dependent upon a number of factors, such as the amount of acetylthiophene being treated, and the particular temperature at which the reaction is carried out. In general, it may be stated that the higher the temperature of reaction, the smaller is the concentration of nitric acid necessary to initiate and maintain the desired reaction. Too great a concentration of nitric acid, on the other hand, has been found to result in excessive coke formation, and to decrease the yield of desired 2-thiophenecarboxylic acid. Nitric acid employed by itself, moreover, is totally ineffective for use in the present process, giving rise to an unwanted mixture of nitroacetylthiophenes. An acetic acid solution of nitric acid containing between about 1 and about 20 per cent by weight of nitric acid has been found to produce desirable results in accordance with the present process, behaving as an oxidizing agent in converting acetylthiophene to thiophenecarboxylic acid. Within the above range, a solution having a nitric acid concentration of between about 7 and about 12 per cent by weight is preferred, particular preference being accorded an acetic acid solution containing about 10 per cent by weight of nitric acid.

The exact function of acetic acid present in the nitric acid solution is not known with certainty. The effect of acetic acid is, however, known to be something more than a mere diluent for the nitric acid since, as will be shown hereinafter, a solution of nitric acid in water was unsatisfactory for the present process, resulting in an extremely small and commercially unattractive yield of 2-thiophenecarboxylic acid, even when the reaction mixture was maintained at an elevated temperature for a comparatively long time.

The temperature at which the reaction is carried out is generally one approaching the reflux temperature at atmospheric pressure of the acetic acid present in the reaction mixture. While temperatures substantially lower than that of reflux may be employed, the process is thereby slowed down, extending the time necessary for completion of the reaction. A temperature appreciably higher than that of reflux, while entirely within the purview of the present invention, requires the use of pressure vessels. Accordingly, it is preferred to carry out the present reaction at atmospheric pressure and at a temperature approximating the reflux temperature of acetic acid. Thus, the preferred temperature is generally within the range of from about 90° C. to about 120° C.

At the completion of the reaction, the desired product of 2-thiophenecarboxylic acid is removed from the reaction product mixture by distilling, preferably under reduced pressure. The comparative ease with which 2-thiophenecarboxylic acid is separated from the reaction product mixture particularly commends the present process to commercial operation by either batch method or use of a continuous procedure of operation.

Thiophenecarboxylic acid produced in accordance with this invention is useful as a dye intermediate, plasticizer, resin intermediate, derivative for pharmaceutical manufacture and intermediate for chemical synthesis.

The following detailed examples are for the purpose of illustrating modes of effecting the preparation of 2-thiophenecarboxylic acid in accordance with the process of this invention. It is to be clearly understood that this invention is not to be considered as limited to the specific reactants disclosed hereinafter or to the manipulations and conditions set forth in the examples.

Example 1

A solution of 10 per cent nitric acid in acetic acid was made by mixing 100 grams of 71 per cent nitric acid with 610 grams of glacial acetic acid. This solution was warmed to 93° C. and 53 grams of 2-acetylthiophene were added at a temperature of 93–100°C. over a period of 50 minutes. The solution was then stirred at 95–103° C. for an additional period of 4 hours and thereafter cooled to room temperature. The resulting reaction product mixture was distilled at a pressure of 11 mm. of mercury to remove most of the acetic acid present. The residue resulting from said distillation was then dissolved under reflux in 200 cc. of water. A mixture containing an oil layer and a water layer was thereby formed. The oil layer was removed and the water layer cooled to 10° C., yielding a large crop of yellow crystals. The crystals were filtered off and recrystallized from naphtha to yield 26 grams (48 per cent yield) of 2-thiophenecarboxylic acid, characterized by a melting point of 123.6–125.6° C.

Example 2

A solution of 7.1 per cent nitric acid in acetic acid was made by mixing 35.5 grams of 71 per cent nitric acid with 320 grams of glacial acetic acid. To this mixture were added 19 grams of 2-acetylthiophene at a temperature of 90–100° C. over a 15-minute period. The entire mixture was then heated for an additional 6 hours at 100–105° C. The resulting reaction product mixture was distilled at atmospheric pressure to remove most of the acetic acid. The residue was then made alkaline with a sodium hydroxide solution and a resulting minor amount of oil was extracted from the solution with ethyl ether. On reacidification of the solution with hydrochloric acid, a precipitate of 2-thiophenecarboxylic acid was formed. The precipitate was filtered off and recrystallized from water. A resulting product of 12 grams (62 per cent yield) of 2-thiophenecarboxylic acid was obtained, having a melting point of 124.6–125.6° C. and a neutralization number of 431.

Example 3

A solution of 20 per cent nitric acid in acetic acid was made by mixing 100 grams of 71 per cent nitric acid with 254 grams of glacial acetic acid. The mixture was heated to 95° C. and 53 grams of 2-acetylthiophene were added over a period of 85 minutes at 95–104° C. The entire mixture was stirred an additional 20 minutes. The resulting reaction product mixture was thereafter distilled at atmospheric pressure to remove most of the acetic acid. The residue remaining was then distilled at a pressure of 8 mm. of mercury to remove the remainder of acetic acid. The distillation was continued to a temperature of 200° C. at a pressure of 5 mm. until crystals of 2-thiophenecarboxylic acid appeared. These crude crystals were recrystallized from water to yield 14.5 grams (27 per cent yield) of 2-thiophenecarboxylic acid. About 10 grams of black coke-like material were recovered as the distillation residue.

Example 4

A solution of 10 per cent nitric acid in water was made by mixing 70 grams of 71 per cent nitric acid with 434 grams of water. The mixture was heated to 95° C. and 52 grams of 2-acetylthiophene were added over a period of 2 hours at 95–100° C. The mixture was allowed to cool and stand 16 hours at 25–30° C. The mixture was then heated at 93–98° C. for an additional 8 hours. The resulting reaction product mixture was separated into two layers and the water layer (A) set aside. The oil layer was mixed with water, made alkaline and extracted with benzene. The resulting alkaline solution was filtered and reacidified with hydrochloric acid. A mixture of crystals and tar was formed. On heating this mixture to 100° C., the crystals redissolved and the tar layer contained in the mixture was withdrawn. The remaining water layer, upon cooling, gave a precipitate (containing some tar), which was filtered off and recrystallized from naphtha. The tar was insoluble in the naphtha and formed a solid deposit therein. The naphtha and crystals were decanted from the tar and filtered. Fine yellow crystals (B) were obtained in the amount of 2 grams and having a melting point of 115–123° C.

The water layer (A) was neutralized with sodium hydroxide evaporated to one-fifth of its volume and reacidified. A precipitate mixed with tar was formed. This precipitate was filtered off and recrystallized from naphtha as described above. The resulting yellow crystals (C) in the amount of 1.5 grams, having a melting point of 123–125° C., were combined with the needles (B) and recrystallized from naphtha. The total combined product of crude 2-thiophenecarboxylic acid was obtained in the amount of only 3.5 grams (9) per cent yield).

From the above Examples 1–3, it will be apparent that the reaction of 2-acetylthiophene with an acetic acid solution of nitric acid provides an effective means of producing 2-thiophenecarboxylic acid. While the present invention, of course, is not to be limited by any theory, it would appear that the reaction mixture should necessarily contain acetic acid. Thus, in Example 4, in which nitric acid dissolved in water was employed as a reactant, the high yields such as obtained in Examples 1–3 were not encountered. The details and description set forth above, however, are not to be construed as limiting except as hereinafter defined by the appended claims.

We claim:

1. A method for producing 2-thiophenecarboxylic acid, which comprises reacting 2-acetylthiophene with an acetic acid solution containing between about 1 and about 20 per cent by weight of nitric acid.

2. A method for producing 2-thiophenecarboxylic acid, which comprises reacting 2-acetylthiophene with an acetic acid solution containing between about 7 and about 12 per cent by weight of nitric acid.

3. The method which comprises reacting 2-acetylthiophene with an acetic acid solution containing between about 1 and about 20 per cent by weight of nitric acid at a temperature between about 90 and about 120° C. at atmospheric pressure until the reaction is substantially complete, and thereafter removing 2-thiophenecarboxylic acid from the reaction product mixture.

4. The method which comprises reacting 2-acetylthiophene with an acetic acid solution containing between about 7 and about 12 per cent by weight of nitric acid at a temperature between about 90 and about 120° C. at atmospheric pressure until the reaction is substantially complete, and thereafter removing 2-thiophenecarboxylic acid from the reaction product mixture.

5. The method which comprises reacting 2-acetylthiophene with an acetic acid solution containing between about 1 and about 20 per cent by weight of nitric acid at reflux temperature and removing 2-thiophenecarboxylic acid from the resulting reaction product mixture.

GEORGE C. JOHNSON.
JOHN W. SCHICK.

REFERENCES CITED

The following references are of record in the file of this patent:

Meyer, Liebigs Ann. Chem. 236, 205 (1886).
Simpson, J. Chem. Soc. (London) 653 (1945).